(12) United States Patent
Kim

(10) Patent No.: US 11,862,964 B2
(45) Date of Patent: Jan. 2, 2024

(54) CIRCUIT FOR AND METHOD OF PROTECTING OVERVOLTAGE IN UNIVERSAL SERIAL BUS INTERFACE

(71) Applicant: SAMSUNG ELECTRONICS CO., LTD., Suwon-si (KR)

(72) Inventor: Je-kook Kim, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/707,062

(22) Filed: Mar. 29, 2022

(65) Prior Publication Data

US 2022/0224107 A1 Jul. 14, 2022

Related U.S. Application Data

(63) Continuation of application No. 16/260,253, filed on Jan. 29, 2019, now Pat. No. 11,296,494.

(30) Foreign Application Priority Data

Aug. 22, 2018 (KR) .................. 10-2018-0098091

(51) Int. Cl.
| | | |
|---|---|---|
| *H01R 13/713* | (2006.01) | |
| *H01R 24/60* | (2011.01) | |
| *H02H 3/20* | (2006.01) | |
| *H02H 7/20* | (2006.01) | |

(Continued)

(52) U.S. Cl.
CPC ............. *H02H 7/20* (2013.01); *H01R 13/713* (2013.01); *H01R 24/60* (2013.01); *H02H 1/0007* (2013.01); *H02H 3/20* (2013.01); *H01R 2107/00* (2013.01)

(58) Field of Classification Search
CPC ...... H01R 24/60; H01R 24/64; H01R 13/713; H02H 3/20–202
See application file for complete search history.

(56) References Cited

U.S. PATENT DOCUMENTS

| | | |
|---|---|---|
| 8,589,110 B2 | 11/2013 | Liu et al. |
| 9,400,546 B1 | 7/2016 | Agarwal et al. |
| 9,529,411 B2 | 12/2016 | Waters et al. |

(Continued)

FOREIGN PATENT DOCUMENTS

| | | |
|---|---|---|
| KR | 10-1821327 B1 | 1/2018 |

OTHER PUBLICATIONS

Korean Office Action dated Sep. 14, 2023, of the corresponding KR Patent Application No. 10-2018-0098091.

*Primary Examiner* — Jared Fureman
*Assistant Examiner* — Christopher J Clark
(74) *Attorney, Agent, or Firm* — Muir Patent Law, PLLC

(57) ABSTRACT

A circuit to protect an overvoltage in a universal serial bus (USB) device include an overvoltage protection (OVP) switch connected to a pin of a USB receptacle and a switch controller to turn off the OVP switch when an overvoltage is detected such that power between the pin and the USB device is interrupted. The switch controller supplies a control signal to the OVP switch such that the OVP switch has a first on-resistance when the USB device is operating in a normal mode and no overvoltage is detected, and has a second on-resistance, higher than the first on-resistance, when the USB device is operating in a low-power mode and no overvoltage is detected.

18 Claims, 14 Drawing Sheets

(51) Int. Cl.
    *H02H 1/00*     (2006.01)
    *H01R 107/00*     (2006.01)

(56) References Cited

U.S. PATENT DOCUMENTS

| | | |
|---|---|---|
| 9,817,458 B2 | 11/2017 | Carpenter, Jr. et al. |
| 11,431,179 B2 | 8/2022 | Heo et al. |
| 2013/0145191 A1 | 6/2013 | Hung et al. |
| 2015/0070085 A1* | 3/2015 | Tyrrell .................... G05F 3/16 |
| | | 327/539 |
| 2016/0190794 A1 | 6/2016 | Forghani-Zadeh et al. |
| 2016/0234894 A1 | 8/2016 | Wang et al. |
| 2017/0054310 A1 | 2/2017 | Chen et al. |
| 2017/0155214 A1 | 6/2017 | Shen et al. |
| 2017/0346240 A1 | 11/2017 | Oporta et al. |
| 2018/0018934 A1 | 1/2018 | Lim et al. |
| 2018/0019587 A1 | 1/2018 | Chen et al. |
| 2018/0060201 A1 | 3/2018 | Newberry |
| 2018/0062381 A1 | 3/2018 | Jarvensivu et al. |
| 2018/0097378 A1 | 4/2018 | Card et al. |
| 2019/0288532 A1 | 9/2019 | Mattos et al. |
| 2019/0393655 A1 | 12/2019 | Bodnaruk et al. |
| 2019/0393707 A1 | 12/2019 | Hunter et al. |

\* cited by examiner

CIRCUIT FOR AND METHOD OF PROTECTING OVERVOLTAGE IN UNIVERSAL SERIAL BUS INTERFACE

CROSS-REFERENCE TO RELATED APPLICATIONS

This application is a continuation of pending U.S. application Ser. No. 16/260,253, filed on Jan. 29, 2019, the entire contents of which is hereby incorporated by reference.

Korean Patent Application No. 10-2018-0098091, filed on Aug. 22, 2018, in the Korean Intellectual Property Office, and entitled: "Circuit for and Method of Protecting Overvoltage in Universal Serial Bus Interface," is incorporated by reference herein in its entirety.

BACKGROUND

1. Field

Embodiments relate to a universal serial bus (USB) interface, and more particularly, to a circuit for and method of protecting an overvoltage in an USB interface.

2. Description of the Related Art

A USB (or USB standard) is a standard for defining a cable, a connector, and a communication protocol to perform communication between devices, and is widely used in various applications. The USB defines not only protocols for transmitting and receiving data but also standards for power transmission. For example, USB power delivery (PD) specifies delivery of high power, e.g., 20V and 5 A. Thus, when a conductive foreign material is introduced into a USB receptacle or an electrical short occurs on a USB cable, damage may occur due to an overcurrent, and the USB receptacle and a USB plug may also be damaged.

SUMMARY

Embodiments are directed to a circuit to protect an overvoltage in a universal serial bus (USB) device, the circuit including an overvoltage protection (OVP) switch connected to a pin of a USB receptacle, and a switch controller to turn off the OVP switch when an overvoltage is detected, such that power between the pin and the USB device is interrupted, wherein the switch controller supplies a control signal to the OVP switch such that the OVP switch has a first on-resistance when the USB device is operating in a normal mode and no overvoltage is detected, and has a second on-resistance, higher than the first on-resistance, when the USB device is operating in a low-power mode and no overvoltage is detected.

Embodiments are directed to a circuit to protect an overvoltage in a universal serial bus (USB) device, the circuit including an overvoltage protection (OVP) switch connected to a pin of a USB receptacle, and a switch controller to turn off the OVP switch when an overvoltage is detected, such that power between the pin and the USB device is interrupted, wherein the switch controller includes a charge pump that is powered up when the USB device is operating in a normal mode and is powered down the charge pump when the USB device is operating in a low-power mode.

Embodiments are directed to a method for protecting an overvoltage in a universal serial bus (USB) device, the method including monitoring a voltage on a pin of a USB receptacle, turning off an overvoltage protection (OVP) switch connected to the pin of the USB receptacle when an overvoltage is detected such that power between the pin and the USB device is interrupted, turning on the OVP switch when the overvoltage is eliminated, and determining whether the USB device is operating in a normal mode or a low-power mode. When the USB device is operating in the normal mode, a first voltage is provided to the OVP switch when no overvoltage is detected. When the USB device is operating in the low-power mode, a second voltage is provided to the OVP switch, the second voltage being less than the first voltage, when no overvoltage is detected Embodiments are directed to a circuit to protect an overvoltage in a universal serial bus (USB) device, the circuit including a first overprotection (OVP) switch and a second OVP switch connected in parallel, and a switch controller. The switch controller includes a first switch connected to the first OVP switch, and to be selectively connected to a ground voltage or a charge pump, the first switch to turn off the first OVP switch when an overvoltage is detected when the USB device is operating in a normal mode such that power between the pin and the USB device is interrupted, and a second switch connected to the second OVP switch, and to be selectively connected to the ground voltage or a positive supply voltage, the second switch to turn off the second OVP switch when an overvoltage is detected and the USB device is operating in a low-power mode, such that power between the pin and the USB device is interrupted, wherein the first OVP switch has a first on-resistance and the second OVP switch has a second on-resistance, higher than the first on-resistance

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
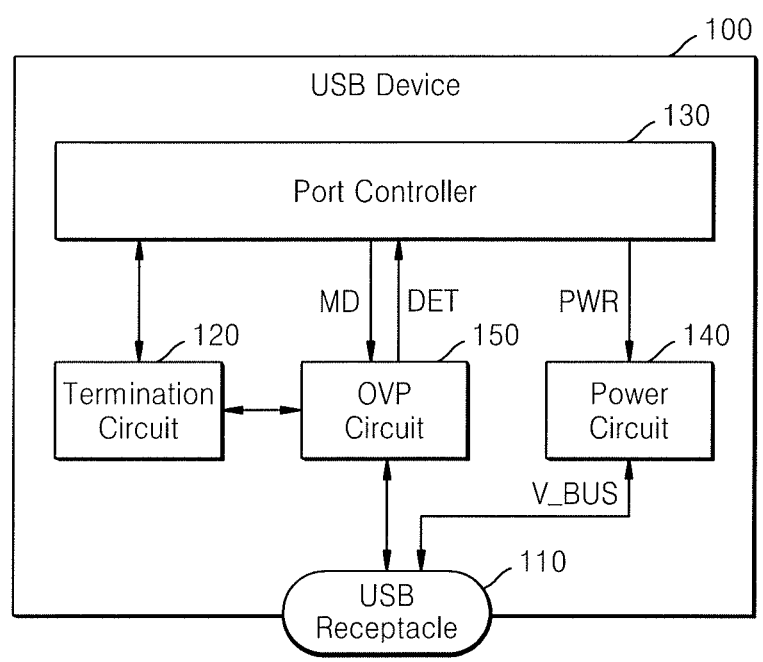
FIG. 1 illustrates a block diagram of a universal serial bus (USB) device according to an example embodiment.
Figure 2:
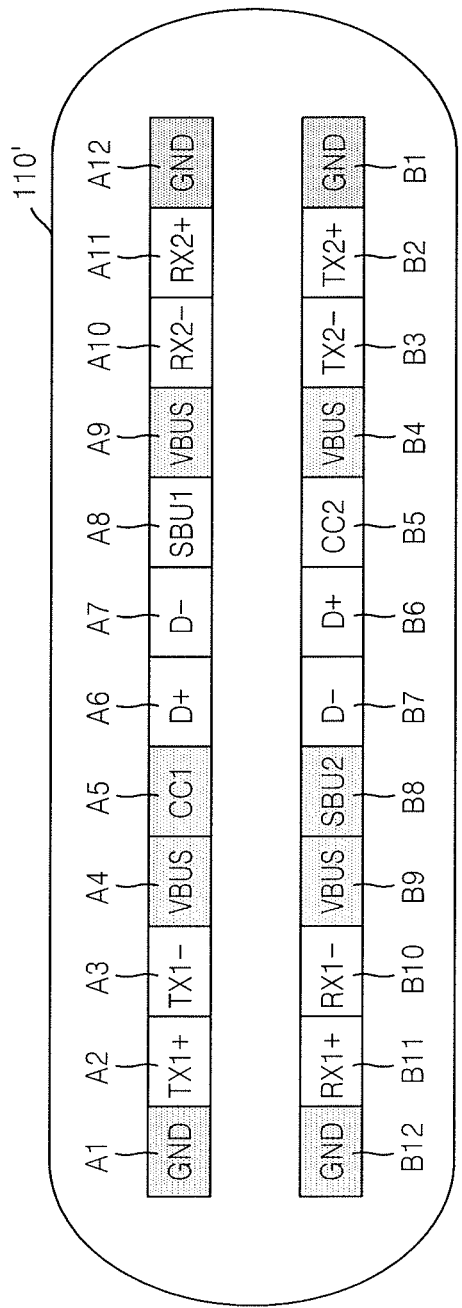
FIG. 2 illustrates a block diagram of an example of a USB receptacle of FIG. 1, according to an example embodiment.

FIG. 1 is a block diagram of a universal serial bus (USB) device 100 according to an example embodiment. FIG. 2 is a block diagram of an example of a USB receptacle 110 of FIG. 1, according to an example embodiment.

Referring to FIG. 1, the USB device 100 may be an arbitrary, i.e., any, device capable of communicating with another device through a USB interface. For example, the USB device 100 may be a stationary device, e.g., a desktop computer, a server, and the like, or a portable device, e.g., a laptop computer, a mobile phone, a tablet personal computer (PC), and the like. Also, the USB device 100 may be a component included in the stationary device or the portable device and configured to provide the USB interface. As shown in FIG. 1, the USB device 100 may include a USB receptacle 110, a termination circuit 120, a port controller 130, a power circuit 140, and an overvoltage protection (OVP) circuit 150.

The USB receptacle 110 may be coupled to a USB cable or a USB plug to be connected to another USB device. The USB receptacle 110 may include a plurality of exposed pins that transmit and receive signals or transmit power. For example, as shown in FIG. 2, the USB receptacle 110 may include pins to transmit transmission signals TX+ and TX−, receive receiving signals RX+ and RX−, channel configuration (CC) signals CC1 and CC2, a VBUS voltage V_BUS, and a ground voltage. In some embodiments, the USB receptacle 110 may have a USB Type-C pin arrangement as shown in FIG. 2.

When a conductive foreign material is introduced into the USB receptacle 110 while the USB plug is not coupled to the USB receptacle 110 or an electrical short occurs in the USB cable coupled to the USB receptacle 110, at least two pins of the USB receptacle 110 may be electrically connected to each other. The pins that are inappropriately electrically connected to each other may cause leakage currents, which may not only cause a communication failure via the USB interface but also may cause damage to the USB device 100 or the other USB device. In particular, when the USB device 100 is a portable device or a component included in the portable device, a conductive material (e.g., water, metal, and the like) may be easily introduced into the USB receptacle 110. Thus, excessive power consumption or damage may occur in the USB device 100. For example, USB power delivery (PD) may define delivery of a high power (e.g., 20 V and 5 A) via a VBUS pin (e.g., A4 of FIG. 2). Also, when the VBUS pin has a short circuit with another pin (e.g., A5 of FIG. 2), a high voltage and current of the VBUS pin may be applied to the shorted pin. To protect an internal circuit (e.g., the termination circuit 120 and the port controller 130) of the USB device 100 from the high voltage and current, the USB device 100 may include the OVP circuit 150.

The OVP circuit 150 may detect an overvoltage occurring at a pin included in the USB receptacle 110 and may electrically disconnect the pin from the internal circuit of the USB device 100 when an overvoltage is detected. Also, the OVP circuit 150 may output an activated detection signal DET when the overvoltage is detected. In some embodiments, the OVP circuit 150 may not attenuate signals transmitted and received via the pins of the USB receptacle 110 in a normal state in which an overvoltage does not occur. The OVP circuit 150 may include a circuit that consumes relatively high power. The USB device 100 may operate in a normal mode and a low-power mode. The OVP circuit 150 may reduce power consumption of the USB device 100 in the low-power mode. Hereinafter, as described below with reference to the drawings, the OVP circuit 150 may provide reduced power consumption in the low-power mode without causing the attenuation of the signals in the low-power mode.

The termination circuit 120 may be controlled by the port controller 130 and provide the USB receptacle 110 with termination in accordance with USB requirements. For example, the termination circuit 120 may transmit CC signals CC1 and CC2 from the port controller 130 to the USB receptacle 110 or transmit the CC signals CC1 and CC2 from the USB receptacle 110 to the port controller 130, under control of the port controller 130. Also, the termination circuit 120 may provide a VCONN voltage for providing power for an active cable from the power circuit 140 to the USB receptacle 110 under control of the port controller 130.

The port controller 130 may communicate with the termination circuit 120, control the termination circuit 120, and control the USB interface in response to signals received through the termination circuit 120. The port controller 130 may control port power supplied to the outside or received from the outside through the USB receptacle 110, and process the CC signals CC1 and CC2 according to USB requirements. In some embodiments, the port controller 130 may be a logic block designed by logic synthesis, a software block included in a memory that stores a processor and instructions executed by the processor, or a combination thereof. In some embodiments, the port controller 130 may be referred to as a power delivery integrated circuit (PDIC). In some embodiments, the termination circuit 120 and the port controller 130 may be included in one IC, and the IC may be referred to as a PDIC.

The port controller 130 may output a power control signal PWR for controlling the power circuit 140. For example, the port controller 130 may perform power negotiation with another USB device and control the power circuit 140 using the power control signal PWR based on the negotiation result.

In some embodiments, the port controller 130 may provide a mode signal MD indicating the normal mode or the low-power mode to the OVP circuit 150, and may receive a detection signal DET indicating whether an overvoltage has occurred from the OVP circuit 150. The port controller 130 may switch a mode between the normal mode and the low-power mode based on a user's input to the USB device 100 or switch a mode between the normal mode and the low-power mode when an entry condition to the normal mode or the low-power mode is satisfied, and generate the mode signal MD indicating a mode. In some embodiments, when an overvoltage occurs, i.e., when an activated detection signal DET is received from the OVP circuit 150, the port controller 130 may control a signal generator (e.g., a speaker, a display, a light-emitting element, a vibration motor, and so forth) to notify occurrence of an overvoltage to the outside of the USB device 100, for example, to output a signal that is recognizable, i.e., detectable, by a user of the USB device 100.

The power circuit 140 may provide a VBUS voltage V_BUS to the USB receptacle 110 or receive the VBUS voltage V_BUS from the USB receptacle 110. In some embodiments, when the USB device 100 supports an upload faced port (UFP), the power circuit 140 may receive the VBUS voltage V_BUS from a power pin (e.g., A4 of FIG. 2) of the USB receptacle 110 and distribute power supplied by the VBUS voltage V_BUS to other components of the USB device 100. In some embodiments, when the USB device 100 supports a download faced port (DFP), the power circuit 140 may provide the VBUS voltage V_BUS to a power pin (e.g., A4 of FIG. 2) of the USB receptacle 110. In some embodiments, the USB device 100 may support a dual role port (DRP) that is switchable between a source (or a host) and a sink (or a device).

In some embodiments, the power circuit 140 may generate a VCONN voltage for providing power for the active cable and provide the VCONN voltage to the termination circuit 120. The VCONN voltage may be provided to a CC1 pin (e.g., A5 of FIG. 2) or a CC2 pin (e.g., B5 of FIG. 2) of the USB receptacle 110 due to an operation of the termination circuit 120 via the control of the port controller 130. As used herein, a voltage for transmitting power, such as the VBUS voltage V_BUS and the VCONN voltage, may be referred to as a power supply voltage.

Referring to FIG. 2, a USB receptacle 110' may have a structure according to USB Type-C. The USB receptacle 110' may have a symmetrical pin arrangement, such that the USB receptacle 110' may be properly coupled with a USB plug regardless of a direction or orientation, e.g., inserted up or down. The USB receptacle 110' may include a TX1+ pin A2, a TX1− pin A3, an RX1+ pin B11, an RX1− pin B10, a TX2+ pin B2, a TX2− pin B3, an Rx2+ pin A11, and an RX2− pin A10 as a data bus. The USB receptacle 110' may include VBUS pins A4, A9, B4, and B9, and the CC1 pin A5 as a power bus and the CC2 pin B5 may also transmit a VCONN voltage according to a direction in which the USB receptacle 110' is coupled to the USB plug. Also, the USB receptacle 110' may include two sideband use (SBU) pins A8 and B8 and two channel configuration (CC) pins A5 and B5. The CC1 pin A5 and the CC2 pin B5 may be referred to collectively as a CC pin. The USB plug coupled to the USB receptacle 110' may include one CC pin CC unlike the USB receptacle 110', and include a dedicated VCOON pin. Finally, the USB receptacle 110' may include four ground (GND) pins A1, A12, B1, and B12 in an outer portion thereof.

As described above, when a foreign material is introduced into the USB receptacle 110', an electrical short may occur in a USB cable connected to the USB receptacle 110', or pins included in the USB receptacle 110' may be released, such that an electrical short may occur between at least two pins. In particular, when an electrical path is formed between power pins (e.g., the VBUS pins A4, A9, B4, and B9) and other pins, leakage currents may markedly increase. For example, the pins A3, A5, A8, A10, B3, B5, B8, and B10 located adjacent to the VBUS pins A3, A9, B4, and B9 may easily have a short circuit with the VBUS pins A3, A9, B4, and B9.

In some embodiments, the OVP circuit 150 may protect the USB device 100 from an overvoltage occurring at an arbitrary pin other than power pins (e.g., the VBUS pins A4, A9, B4, and B9) and ground pins (e.g., the GND pins A1, A12, B1, and B12)) in the USB receptacle 110'. Furthermore, in some embodiments, the OVP circuit 150 of FIG. 1 may protect the USB device 100 from an overvoltage occurring at the pins A3, A5, A8, A10, B3, B5, B8, and B10 that are located adjacent to the VBUS pins A4, A9, B4, and B9. Hereinafter, an operation of protecting the USB 100 from an overvoltage occurring at the CC1 pin A5 adjacent to the VBUS pin A4 will be mainly described.

Figure 3:
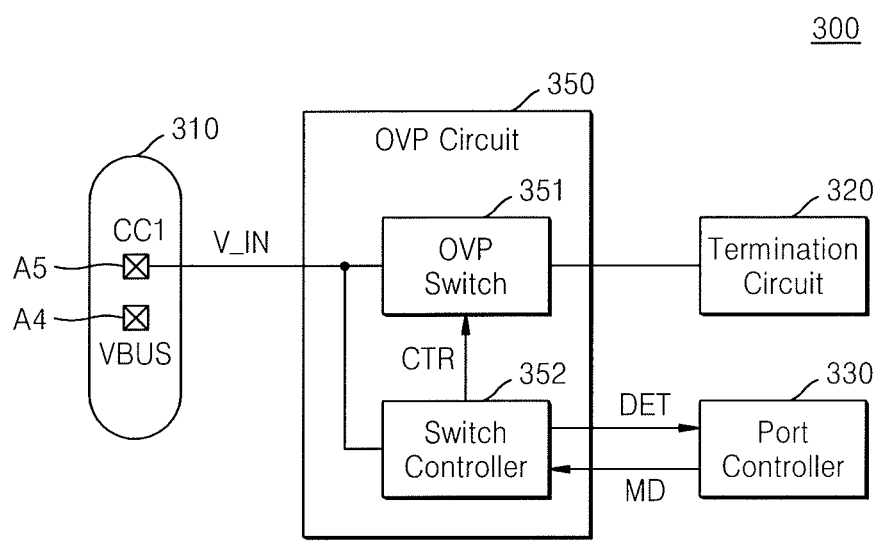
FIG. 3 illustrates a block diagram of a USB device according to an example embodiment.

FIG. 3 is a block diagram of a USB device 300 according to an example embodiment. Specifically, FIG. 3 illustrates the USB device 300 including an OVP circuit 350 configured to protect the USB device 300 from an overvoltage occurring at a CC1 pin A5. Similar to the USB device 100 of FIG. 1, the USB device 300 may include a USB receptacle 310, a termination circuit 320, a port controller 330, and an OVP circuit 350. In FIG. 3, the same descriptions as with reference to FIG. 1 will not be repeated.

Referring to FIG. 3, the OVP circuit 350 may include an OVP switch 351 and a switch controller 352. The OVP switch 351 may be coupled to one or more CC pins described above. While the operation of the OVP circuit 350 is described below with respect to a CC1 pin A5, it is understood that the operation may also be performed with respect to a CC2 pin B5 (and VBUS pin B4).

For example, a CC1 pin A5 of the USB receptacle 310, and may be coupled to the termination circuit 320 to interrupt VCONN. The OVP switch 351 may electrically connect the CC1 pin A5 to the termination circuit 320 or disconnect the CC1 pin A5 from the termination circuit 320 in response to a control signal CTR received from the switch controller 352. When the CC1 pin A5 is electrically connected to the termination circuit 320 by the OVP switch 351, the OVP switch 351 may have an on-resistance Ron. To minimize the distortion of a signal passing through the CC1 pin A5, the OVP switch 351 may have a low on-resistance Ron. In addition, when the CC1 pin A5 is electrically connected to the termination circuit 320 by the OVP switch 351, the OVP switch 351 may not limit a swing of the signal passing through the CC1 pin A5. Thus, as described below with reference to FIG. 5, the OVP switch 351 may receive a boosted voltage.

The switch controller 352 may be coupled to the CC1 pin A5 of the USB receptacle 310 and may detect an overvoltage occurring at the CC1 pin A5 based on a voltage (i.e., an input voltage V_IN) of the CC1 pin A5. For example, as described above with reference to FIG. 2, the CC1 pin A5 may be located adjacent, e.g., immediately next, to the VBUS pin A4 in the USB receptacle 310. Thus, when the CC1 pin A5 has a short circuit with the VBUS pin A4, a VBUS voltage V_BUS may be applied to the CC1 pin A5. The switch controller 352 may detect the overvoltage occurring at the CC1 pin A5 based on a level of the input voltage V_IN, control the OVP switch 351 using the control signal CTR, and electrically disconnect the CC1 pin A5 from the termination circuit 320.

The switch controller 352 may receive a mode signal MD from the port controller 330, and provide a detection signal DET to the port controller 330. As described above with reference to FIG. 1, the detection signal DET may indicate whether an overvoltage has occurred at the CC1 pin A5, and the mode signal MD may indicate a mode (i.e., a normal mode or a low-power mode) of the USB device 300. The switch controller 352 may generate the control signal CTR based on both the input voltage V_IN and the mode signal MD. An example of an operation of the switch controller 352 will be described below with reference to FIG. 4.

Figure 4:
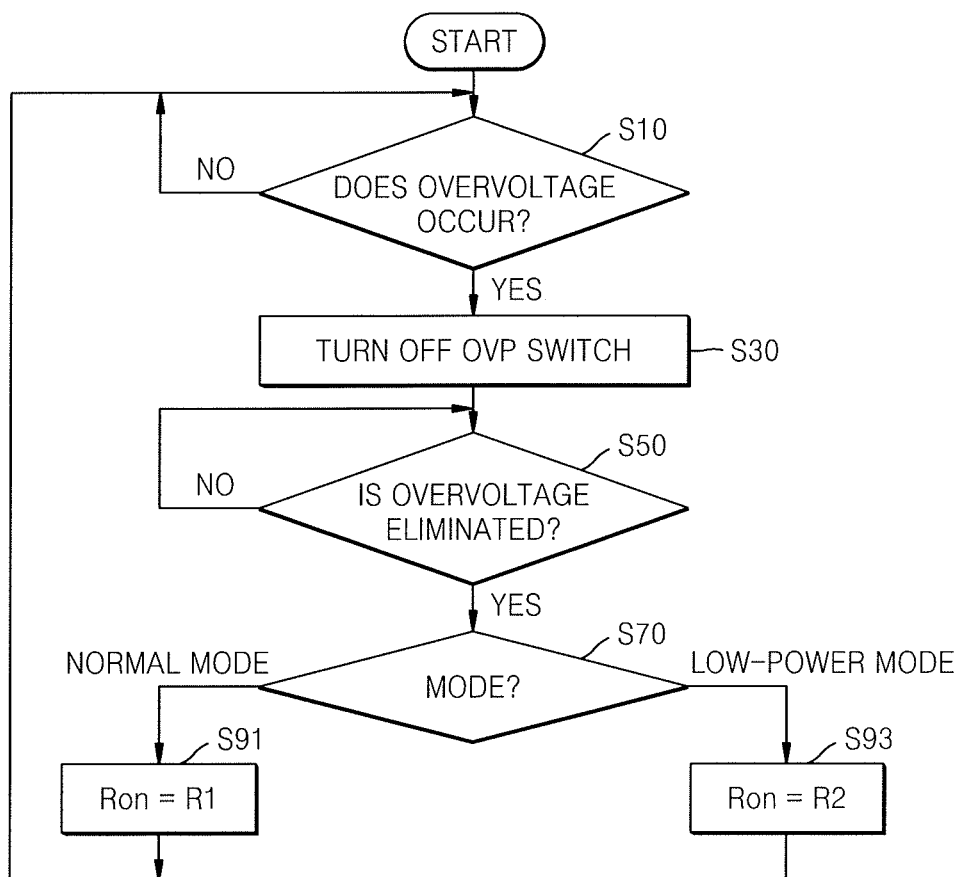
FIG. 4 illustrates a flowchart of a method of protecting an overvoltage in a USB interface according to an example embodiment.

FIG. 4 is a flowchart of a method of protecting an overvoltage in a USB interface according to an example embodiment. For example, the method of FIG. 4 may be performed by the OVP circuit 350 of FIG. 3. Hereinafter, FIG. 4 will be described with reference to FIG. 3.

In operation S10, an operation of detecting an overvoltage may be performed. For example, the switch controller 352 may determine whether the overvoltage occurs based on an input voltage V_IN of a CC1 pin A5. In some embodiments, an overvoltage may refer to a voltage that deviates from a voltage range defined by a USB standard for the CC1 pin A5. For example, the USB standard may define a voltage level between −0.25 V and 1.8 V for a signal passing through the CC1 pin A5, and an overvoltage is considered to have occurred when the CC1 pin A5 has a voltage that deviates from a range between −0.25 V and 1.8 V. In some embodiments, an overvoltage may be determined based on a maximum input voltage of internal circuits of the USB device 300. For example, the internal circuits (e.g., the termination circuit 320 and the port controller 330) of the USB device 300 may receive a voltage of about 3.3 V as a positive supply voltage (e.g., VDD of FIG. 5), and an overvoltage may be considered to have occurred when a detected voltage deviates from range between 0 V and 3.3 V. In some embodiments, the overvoltage may correspond to a voltage that deviates from a voltage range between 0 V and 5 V. In some embodiments, the overvoltage may be considered to have occurred when a detected voltage deviates from a range including a predetermined margin and one of the above-described voltage ranges. As shown in FIG. 4, when the overvoltage is not detected, operation S10 may be repeatedly performed, whereas when the overvoltage is detected, operation S30 may be subsequently performed.

In operation S30, an operation of turning off the OVP switch 351 may be performed. For example, the switch controller 352 may generate a control signal CTR so that the OVP switch 351 may electrically disconnect the CC1 pin A5 from the termination circuit 320, i.e., the OVP switch 351 may be turned off.

In operation S50, an operation of determining whether the overvoltage has been eliminated may be performed. For example, the switch controller 352 may determine whether the overvoltage has been eliminated at the CC1 pin A5 based on the input voltage V_IN of the CC1 pin A5. As shown in FIG. 4, when the overvoltage has not been eliminated, operation S50 may be repeatedly performed, and the OVP switch 351 may remain turned off. Otherwise, when the overvoltage has been eliminated, operation S70 may be subsequently performed.

In operation S70, an operation of determining a mode of the USB device 300 may be performed. For example, the switch controller 352 may determine the mode of the USB device 300 based on a mode signal MOD received from the port controller 330. As shown in FIG. 4, when the USB device 300 is in a normal mode, operation S91 may be subsequently performed, whereas when the USB device 300 is in a low-power mode, operation S93 may be subsequently performed.

When the USB device 300 is in the normal mode, an operation of setting an on-resistance Ron of the OVP switch 351 as a first resistance R1 may be performed in operation S91. As described above with reference to FIG. 3, the first resistance R1 may correspond to a relatively low resistance to reduce the distortion of a signal passing through the CC1 pin A5. For example, the switch controller 352 may generate a control signal CTR having a boosted voltage so that the OVP switch 351 may have the first resistance R1 as the on-resistance Ron. As described below with reference to FIG. 5, the switch controller 352 may include a charge pump (e.g., 51 of FIG. 5) configured to generate a boosted voltage from positive supply voltages of internal circuits of the USB device 300. As used herein, the first resistance R1 may refer to a resistance lower than a second resistance R2 to be described below.

When the USB device 300 is in the low-power mode, an operation of setting the on-resistance Ron of the OVP switch 351 as the second resistance R2 may be performed in operation S93. The second resistance R2 may be higher than the first resistance R1. For example, the switch controller 352 may generate a control signal CTR having an unboosted voltage such that the OVP switch 351 has the second resistance R2 as the on-resistance Ron, and the charge pump included in the switch controller 352 may be powered down. Thus, the switch controller 352 may consume reduced power in the low-power mode. As a result, efficiency of the USB device 300 may be improved in the low-power mode.

Figure 5:
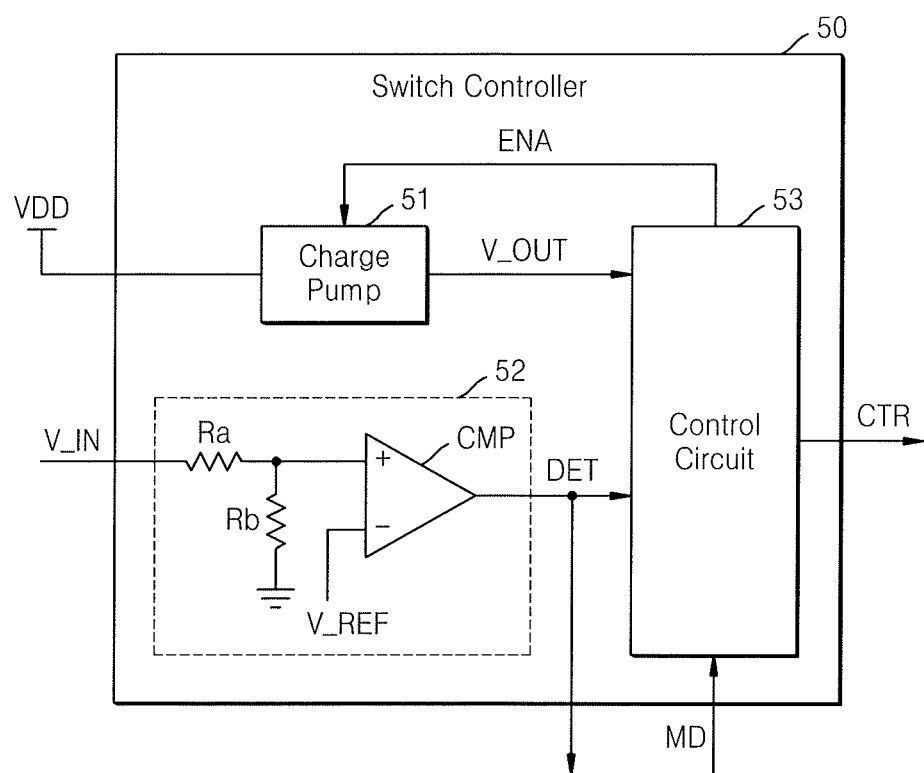
FIG. 5 illustrates a block diagram of a switch controller according to an example embodiment.

FIG. 5 is a block diagram of a switch controller 50 according to an example embodiment. For example, FIG. 5 illustrates an example of the switch controller 352 of FIG. 3. As described above with reference to FIG. 3, the switch controller 50 of FIG. 5 may receive an input voltage V_IN from the CC1 pin A5, receive a mode signal MD from the port controller 330, and generate a detection signal DET and a control signal CTR. As shown in FIG. 5, the switch controller 50 may include a charge pump 51, an overvoltage detector 52, and a control circuit 53. Hereinafter, FIG. 5 will be described with reference to FIGS. 3 and 4.

The charge pump 51 may receive a positive supply voltage VDD and generate a boosted voltage (i.e., an output voltage V_OUT) based on the positive supply voltage VDD. The output voltage V_OUT generated by the charge pump 51 may be provided by the control circuit 53 to an OVP switch 351 under certain conditions, described below. The OVP switch 351 may provide a first resistance R1 as an on-resistance Ron in response to the output voltage V_OUT. In some embodiments, the OVP switch 351 may include an n-channel field-effect transistor (NFET), and the charge pump 51 may generate an output voltage V_OUT that is higher than the positive supply voltage VDD. In some embodiments, the OVP switch 351 may include a p-channel FET (PFET), and the charge pump 51 may generate an output voltage V_OUT that is lower than a ground voltage. The charge pump 51 may have an arbitrary, i.e., any, configuration that generates an output voltage V_OUT. For example, the charge pump 51 may include at least one capacitor and at least one switch and receive a clock signal.

The charge pump 51 may operate or be powered down in response to an enable signal ENA received from the control circuit 53. For example, the charge pump 51 may generate a boosted output voltage V_OUT from the positive supply voltage VDD in response to an activated enable signal ENA and may be powered down in response to a deactivated enable signal ENA.

The overvoltage detector 52 may receive an input voltage V_IN from the CC1 pin A5 and determine whether an overvoltage has occurred at the CC1 pin A5 based on the input voltage V_IN. For example, the overvoltage detector 52 may include resistors Ra and Rb that divide the input voltage V_IN and a comparator CMP. The comparator CMP may compare a voltage divided from the input voltage V_IN with a reference voltage V_REF, and output an activated detection signal DET when the divided voltage is higher than the reference voltage V_REF. Alternatively, the overvoltage detector 52 may have any structure that generates the detection signal DET according to a magnitude of the input voltage V_IN.

The control circuit 53 may generate an enable signal ENA and a control signal CTR based on the detection signal DET received from the overvoltage detector 52 and the mode signal MD received from the port controller 130. For example, in response to the activated detection signal DET, the control circuit 53 may output a control signal CTR to turn off the OVP switch 351. Also, in response to a mode signal MD indicating a low-power mode, the control circuit 53 may output a deactivated enable signal ENA to power down the charge pump 51. As described below with reference to FIG. 6, in some embodiments, the control circuit 53 may include at least one logic gate to receive the detection signal DET and/or the mode signal MD as input signals, and include at least one switch that is turned on/off based on an output signal of the at least one logic gate. Examples of a configuration and an operation of the control circuit 53 will be described below with reference to FIGS. 6, 8, and 10.

Figure 6:
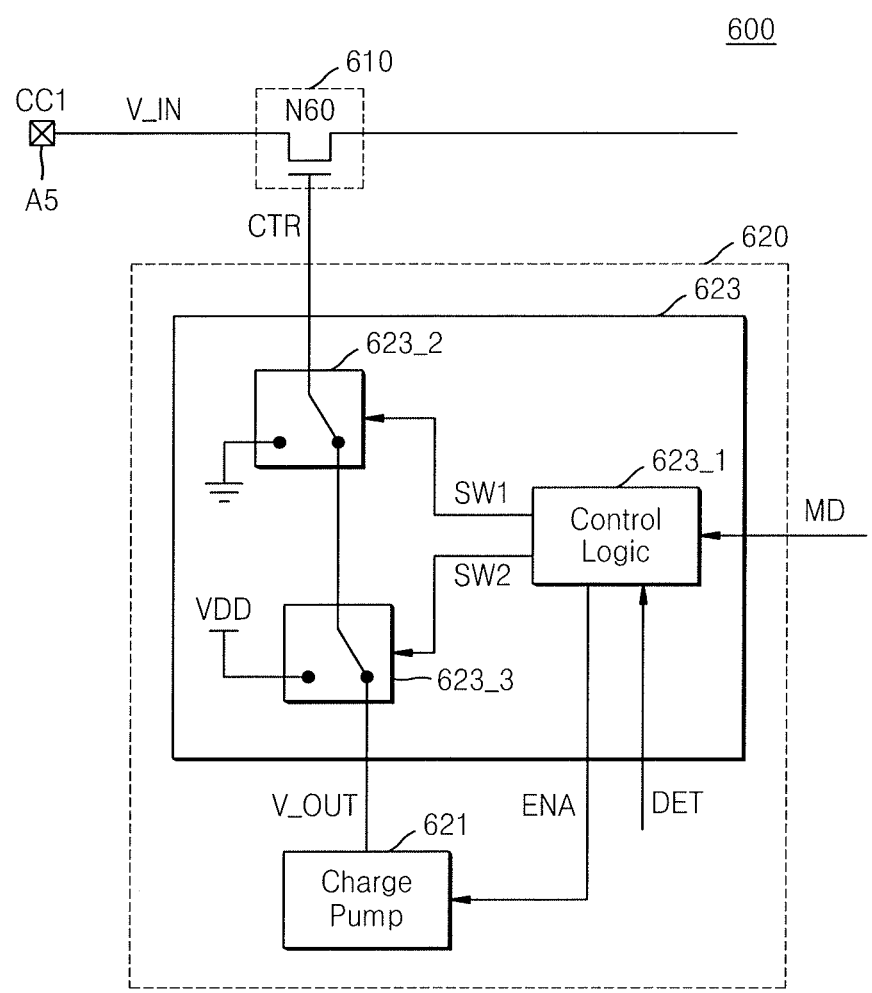
FIG. 6 illustrates a block diagram of a USB device according to an example embodiment.
Figure 7A:
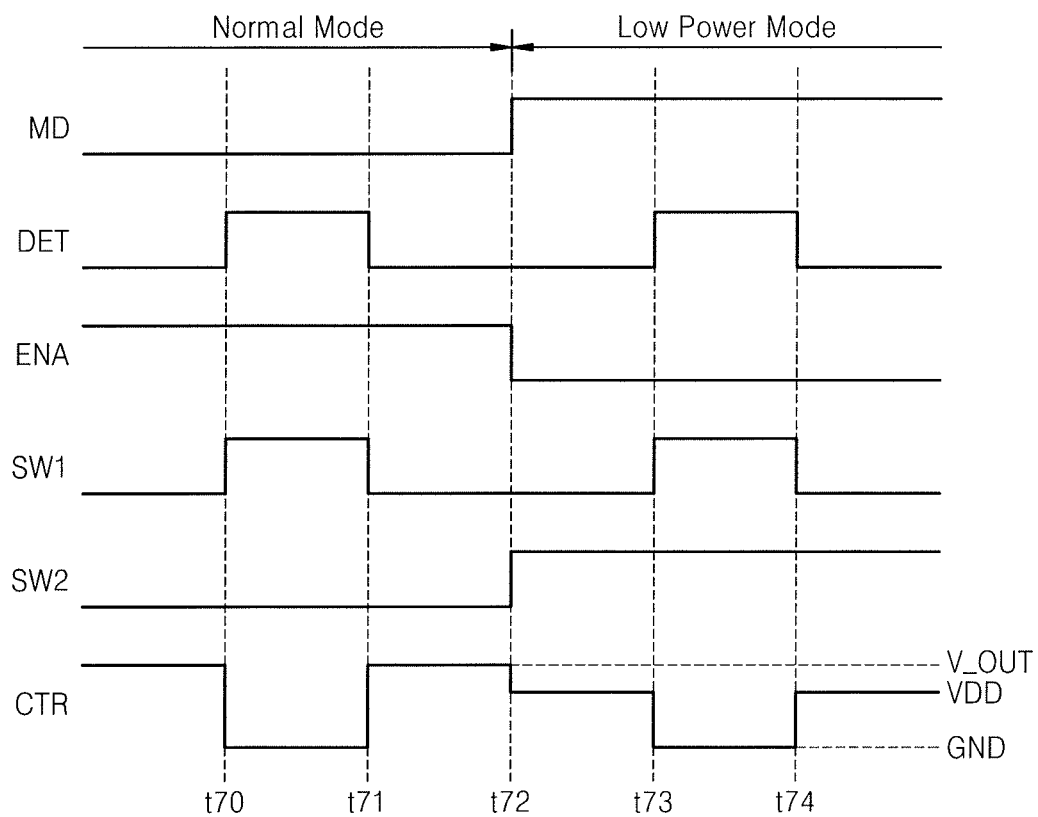
FIGS. 7A and 7B illustrate diagrams of examples of an operation of the USB device of FIG. 6, according to example embodiments.
Figure 7B:
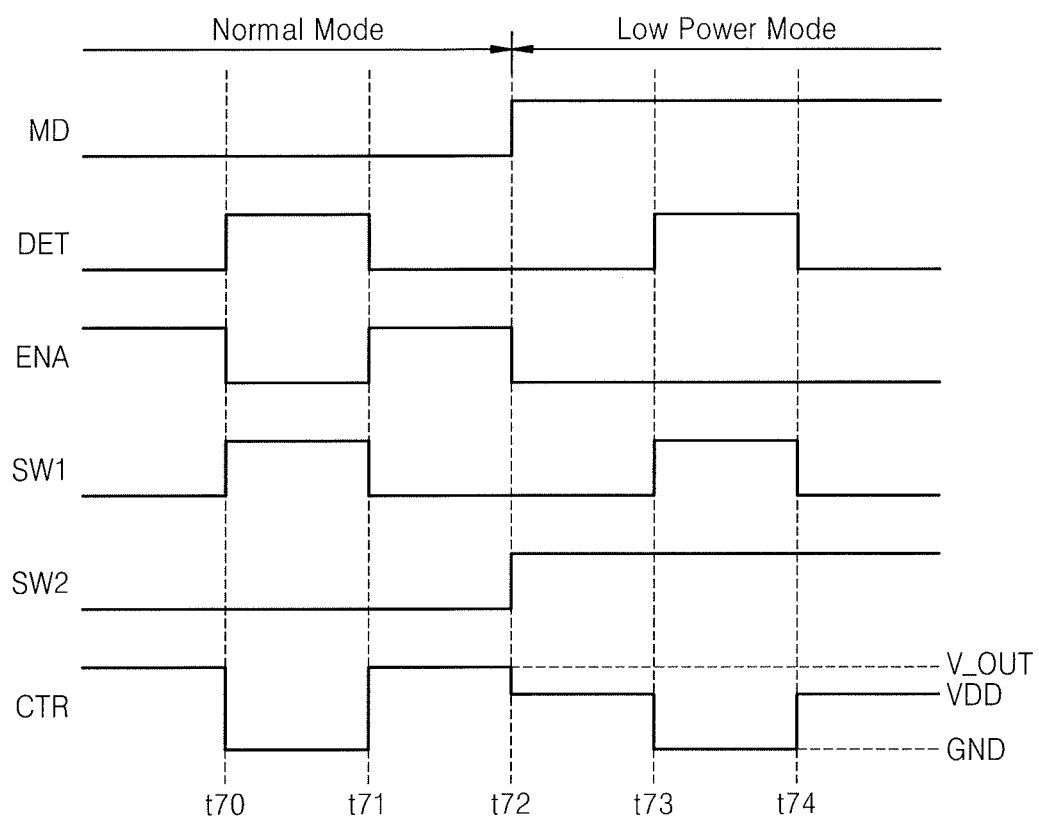

FIG. 6 is a block diagram of a USB device 600 according to an example embodiment. FIGS. 7A and 7B are diagrams of examples of an operation of the USB device 600 of FIG. 6, according to example embodiments. Specifically, FIG. 6 illustrates the USB device 600 including an OVP switch 610 including an NFET N60 and a switch controller 620 configured to control the OVP switch 610, and FIGS. 7A and 7B illustrate signals of the USB device 600 of FIG. 6 with respect to time. In FIGS. 6, 7A, and 7B, it is assumed that the signals are active high signals. Thus, an activated signal may have a high level, while a deactivated signal may have a low signal. In FIGS. 7A and 7B, repeated descriptions will not be repeated.

Referring to FIG. 6, the OVP switch 610 may include an NFET N60 to serve as a switch that is turned on and off based on a control signal CTR. Although only one NFET N60 is illustrated in FIG. 6, in some embodiments, the OVP switch 610 may include a plurality of NFETs connected in series that commonly receive the control signal CTR and/or a plurality of NFETs connected in parallel to each other that commonly receive the control signal CTR. The NFET N60 may have an on-resistance Ron, which is reduced as a gate voltage (i.e., a voltage of the control signal CTR) increases.

The switch controller 620 may include a charge pump 621 and a control circuit 623. The control circuit 623 may include a control logic 623_1, a first switch 623_2, and a second switch 623_3. The control logic 623_1 may receive a detection signal DET and a mode signal MD, and generate a first switch signal SW1 and a second switch signal SW2 based on the detection signal DET and the mode signal MD. The first switch 623_2 may connect a gate of the NFET N60 to a ground voltage or the second switch 623_3 based on the first switch signal SW1. The second switch 623_3 may connect the first switch 623_2 to a positive supply voltage VDD or the charge pump 621 based on the second switch signal SW2. States of the first switch 623_2 and the second switch 623_3 shown in FIG. 6 may correspond to states in which the first switch 623_2 and the second switch 623_3 receive a deactivated first switch signal SW1 and a deactivated second switch signal SW2, i.e., a low-level first switch signal SW1 and a low-level second switch signal SW2, respectively.

Referring to FIG. 7A, the mode signal MD may have a low level in a normal mode until a time point t72, and have a high level in a low-power mode from the time point t72. Alternatively, the mode signal MD may have a high level in the normal mode and a low level in the low-power mode.

Until a time point t70, an overvoltage may not be detected at the CC1 pin A5 and, thus, the detection signal DET may be at a low level. The control logic 623_1 may generate a high-level enable signal ENA based on a low-level mode signal MD, so that the charge pump 621 may generate an output voltage V_OUT. Also, the control logic 623_1 may generate a low-level first switch signal SW1 and a low-level second switch signal SW2 based on the low-level detection signal DET. As a result, the first switch 623_2 and the second switch 623_3 may be in states shown in FIG. 6, and the output voltage V_OUT of the charge pump 621 may be provided as a control signal CTR to the OVP switch 610. Thus, the on-resistance Ron of the OVP switch 610 may correspond to the first resistance R1 lower than the second resistance R2.

At the time point t70, the overvoltage may occur at the CC1 pin A5 and, thus, the detection signal DET may transition to a high level. In response to an activated detection signal DET, the control logic 623_1 may output an activated first switch signal SW1, so that the control signal CTR may have a ground voltage GND due to the first switch 623_2. Thus, the NFET N60 may and the OVP switch 610 may be turned off.

At a time point t71, the overvoltage may be eliminated at the CC1 pin A5 and thus, the detection signal DET may transition to a low level. In response to a deactivated detection signal DET, the control logic 623_1 may output a deactivated first switch signal SW1, so that the control signal CTR may have an output voltage V_OUT.

At the time point t72, the USB device 600 may be switched from the normal mode to the low-power mode and the mode signal MD may transition to a high level. In response to a high-level mode signal MD, the control logic 623_1 may output a deactivated enable signal ENA and, thus, the charge pump 621 may be powered down. Also, in response to the high-level mode signal MD, the control logic 623_1 may output an activated second switch signal SW2, so that a positive supply voltage VDD may be provided as a control signal CTR to the OVP switch 610. Thus, the on-resistance Ron of the OVP switch 610 may correspond to the second resistance R2 higher than the first resistance R1.

At a time point t73, an overvoltage may occur at the CC1 pin A5 and, thus, the detection signal DET may transition to a high level. In response to an activated detection signal DET, the control logic 623_1 may output an activated first switch signal SW1, so that the control signal CTR may have a ground voltage GND due to the first switch 623_2. Thus, the NFET N60 and the OVP switch 610 may be turned off.

At a time point t74, the overvoltage may be eliminated at the CC1 pin A5 and, thus, the detection signal DET may transition to a low level. In response to a deactivated detection signal DET, the control logic 623_1 may output a deactivated first switch signal SW1, so that the control signal CTR may have a positive supply voltage VDD.

Referring to FIG. 7B, in some embodiments, the charge pump 621 may be powered down even in the normal mode when an overvoltage is detected. For example, at a time point t70 of FIG. 7B, an overvoltage may occur at the CC1 pin A5 and, thus, the detection signal DET may transition to a high level. In response to an activated detection signal DET, the control logic 623_1 may output not only an activated first switch signal SW1 but also a deactivated enable signal ENA. As a result, the charge pump 621 may be powered down. Thus, power consumption may be reduced even in the normal mode when the overvoltage is detected.

Figure 8:
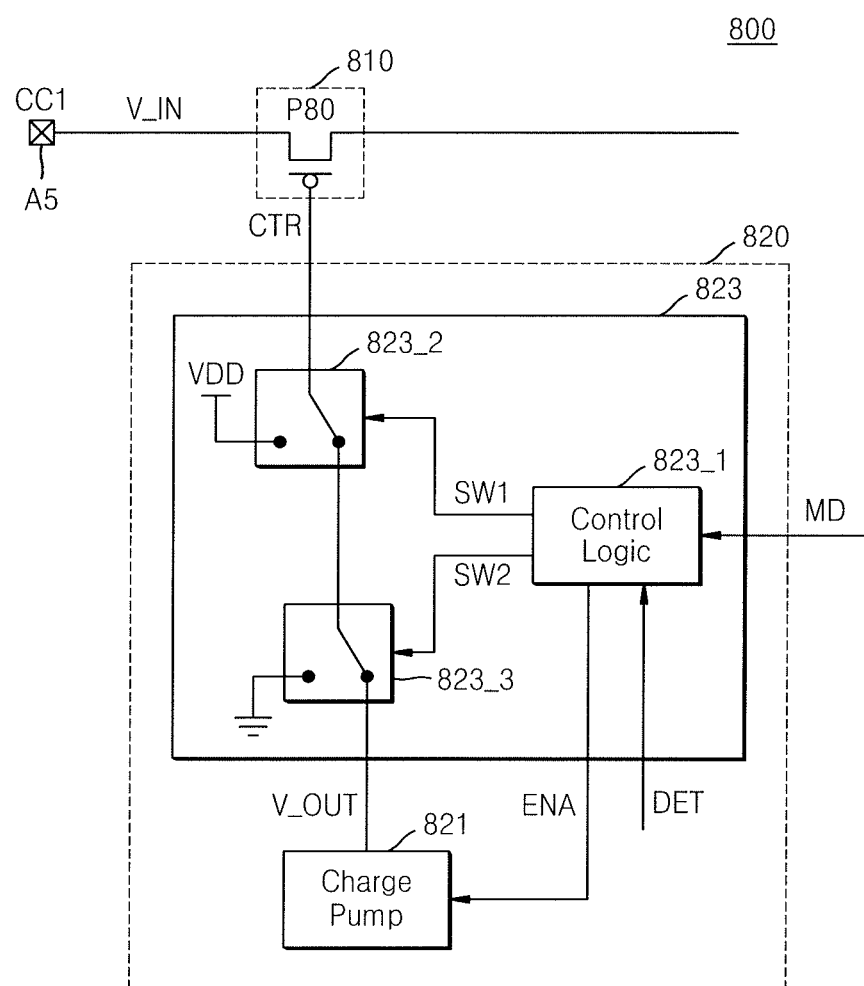
FIG. 8 illustrates a block diagram of a USB device according to an example embodiment.
Figure 9:
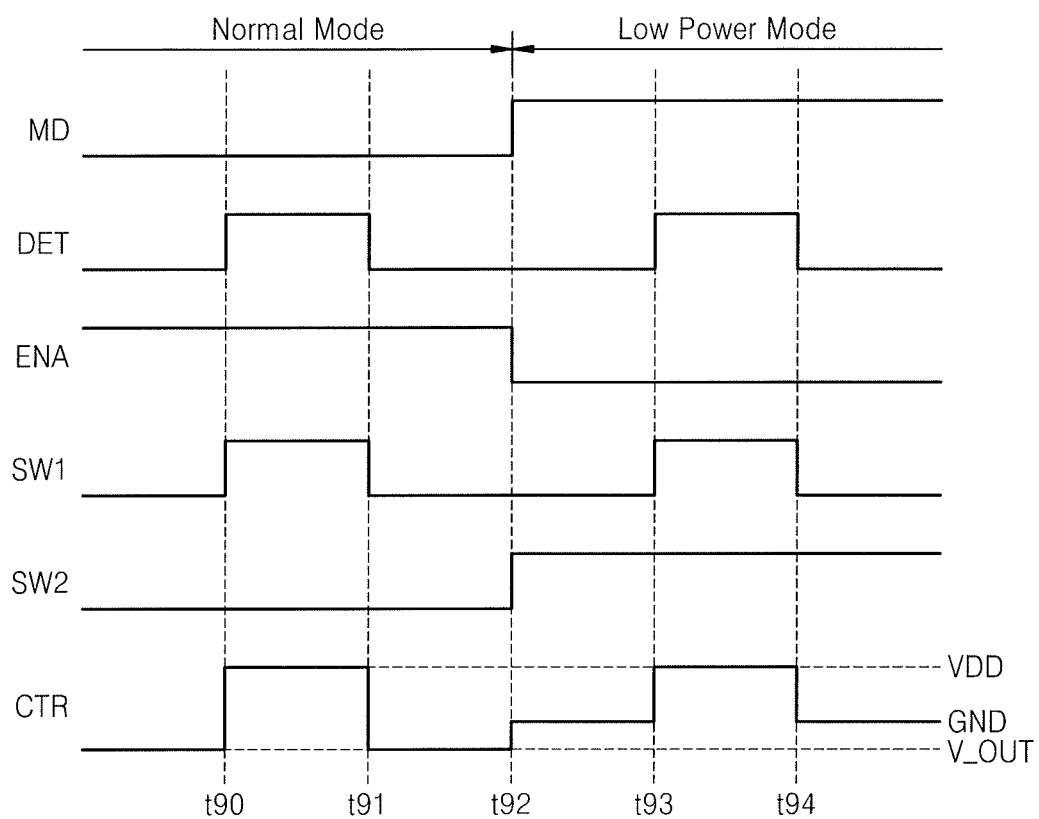
FIG. 9 illustrates a timing diagram of an example of an operation of the USB device of FIG. 7, according to an example embodiment.

FIG. 8 is a block diagram of a USB device 800 according to an example embodiment. FIG. 9 is a timing diagram of an example of an operation of the USB device 800 of FIG. 8, according to an example embodiment. Specifically, FIG. 8 illustrates the USB device 800 including an OVP switch 810 including a PFET P80 and a switch controller 820 configured to control the OVP switch 810. FIG. 9 illustrates signals of the USB device 800 of FIG. 8 with respect to time. In FIGS. 8 and 9, it is assumed that the signals are active high signals, and the same descriptions as with reference to FIGS. 6, 7A, and 7B will not be repeated.

Referring to FIG. 8, the OVP switch 810 may include a PFET P80 that serves as a switch that is turned on and off based on a control signal CTR. Although FIG. 8 illustrates only one PFET P80, in some embodiments, the OVP switch 810 may include a plurality of PFETs connected in series to each other to commonly receive a control signal CTR, and/or a plurality of PFETs connected in parallel to each other to commonly receive the control signal CTR. The PFET P80 may have an on-resistance Ron, which is reduced as a gate voltage (i.e., a voltage of the control signal CTR) is reduced.

The switch controller 820 may include a charge pump 821 and a control circuit 823. Unlike the charge pump 621 of FIG. 6 that generates the output voltage V_OUT higher than the power supply voltage VDD, the charge pump 821 may generate an output voltage V_OUT lower than a ground voltage. The control circuit 823 may include a control logic 823_1, a first switch 823_2, and a second switch 823_3. The first switch 823_2 may connect a gate of the PFET P80 to a positive supply voltage VDD or the second switch 823_3 based on a first switch signal SW1. The second switch 823_3 may connect the first switch 823_2 to the ground voltage or the charge pump 821 based on a second switch signal SW2. States of the first switch 823_2 and the second switch 823_3 shown in FIG. 8 may correspond to a deactivated first switch signal SW1 and a deactivated second switch signal SW2, i.e., a low-level first switch signal SW1 and a low-level second switch signal SW2, respectively.

Referring to FIG. 9, similar to FIGS. 7A and 7B, a mode signal MD may have a low level in a normal mode until a time point t92, and have a high level in a low-power mode from the time point t92. Also, an overvoltage may occur at a CC1 pin A5 at a time point t90 and a time point t93, while the overvoltage may be eliminated at the CC1 pin A5 at a time point t91 and a time point t94.

Until the time point t90, a detection signal DET may be at a low level, and the control logic 823_1 may generate a low-level first switch signal SW1 and a low-level second switch signal SW2 based on the low-level detection signal DET. Thus, the first switch 823_2 and the second switch 823_3 may be in states shown in FIG. 8, and an output voltage V_OUT of the charge pump 821 may be provided as a control signal CTR to the OVP switch 810. Thus, an on-resistance Ron of the OVP switch 810 may correspond to a first resistance R1 lower than a second resistance R2.

At the time point t90, the detection signal DET may transition to a high level. The control logic 823_1 may output an activated first switch signal SW1 in response to an activated detection signal DET and thus, the control signal CTR may have a positive supply voltage VDD due to the first switch 823_2. Thus, the PFET P80 and the OVP switch 810 may be turned off. Next, at the time point t91, the detection signal DET may transition to a low level, so that the control logic 823_1 may output a deactivated first switch signal SW1 in response to a deactivated detection signal DET. As a result, the control signal CTR may have an output voltage V_OUT. In some embodiments, as described above with reference to FIG. 7B, the control logic 823_1 may output a deactivated enable signal ENA unlike shown in FIG. 9, so that the charge pump 821 may be powered down from the time point t90 to the time point t91.

At the time point t92, the control logic 823_1 may output a deactivated enable signal ENA in response to the high-level mode signal MD and, thus, the charge pump 821 may be powered down. Also, the control logic 823_1 may output an activated second switch signal SW2 in response to the high-level mode signal MD, so that a ground voltage GND may be provided as a control signal CTR to the OVP switch 810. As a result, the on-resistance Ron of the OVP switch 810 may correspond to the second resistance R2 higher than the first resistance R1.

At the time point t93, the detection signal DET may transition to a high level and the control logic 823_1 may output an activated first switch signal SW1 in response to an activated detection signal DET, so that the control signal CTR may have a positive supply voltage VDD due to the first switch 823_2. Thus, the PFET P80 may be turned off, and the OVP switch 810 may be turned off. Next, at a time point t94, the detection signal DET may transition to a low level. In response to a deactivated detection signal DET, the control logic 823_1 may output a deactivated first switch signal SW1 and thus, the control signal CTR may have a ground voltage GND.

In some embodiments, the OVP switch 351 of FIG. 3 may include an NFET and a PFET connected in parallel and/or in series to each other. Thus, the switch controller 352 may include a first charge pump that generates a first output voltage higher than the positive supply voltage VDD and a second charge pump that generates a second output voltage lower than the ground voltage GND. The switch controller 352 may perform the above-described operations with reference to FIGS. 7A, 7B, and 8. Thus, both the first charge pump and the second charge pump may be powered down in the low-power mode.

Figure 10:
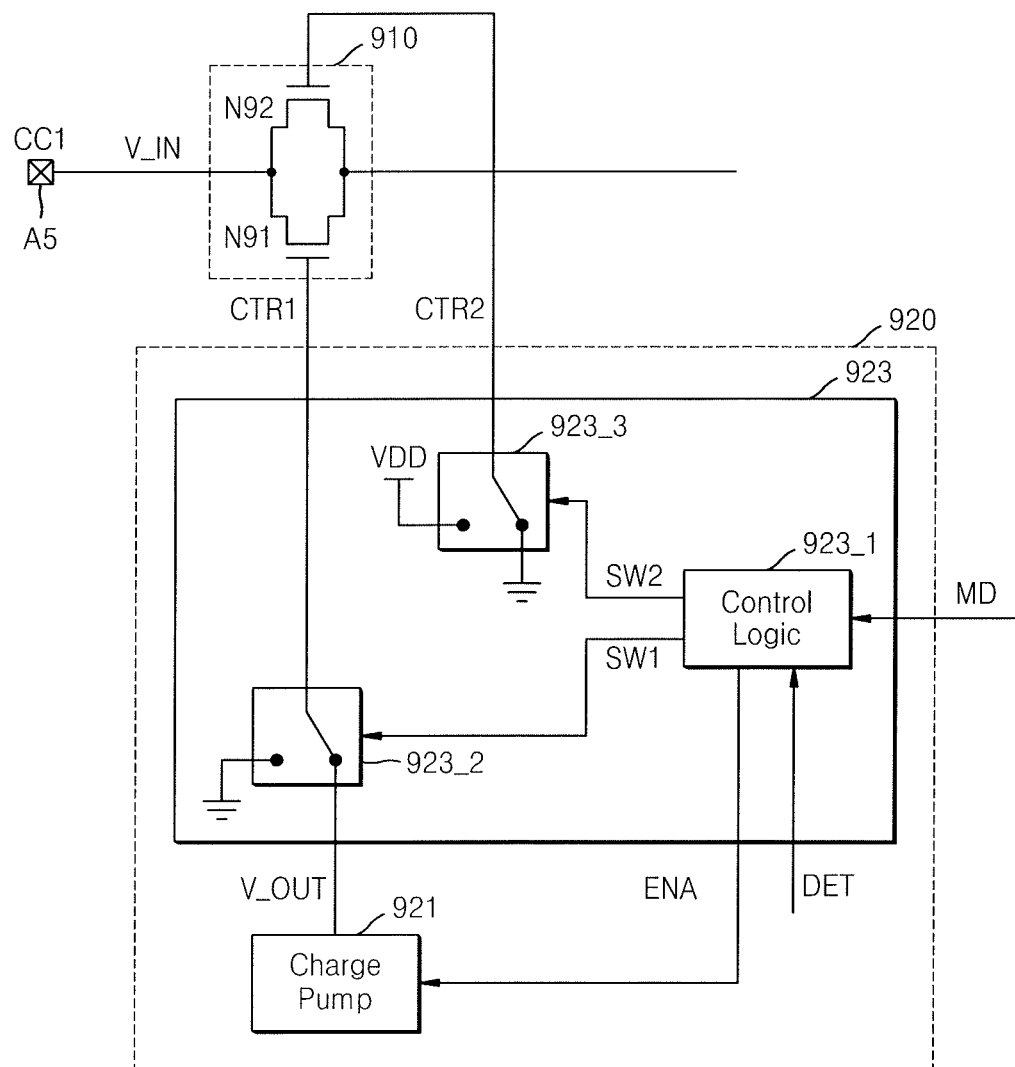
FIG. 10 illustrates a block diagram of a USB device according to an example embodiment.
Figure 11A:
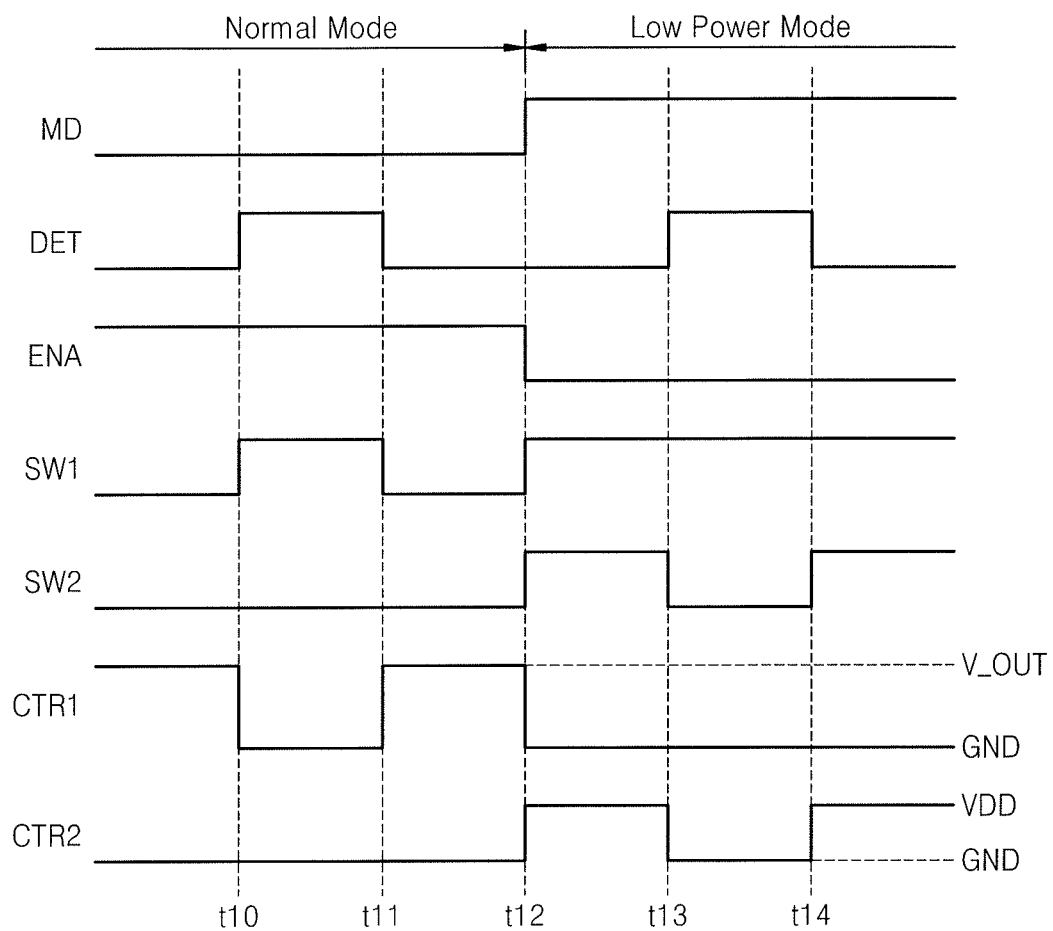
FIGS. 11A and 11B illustrate diagrams of examples of an operation of the USB device of FIG. 10, according to example embodiments.
Figure 11B:
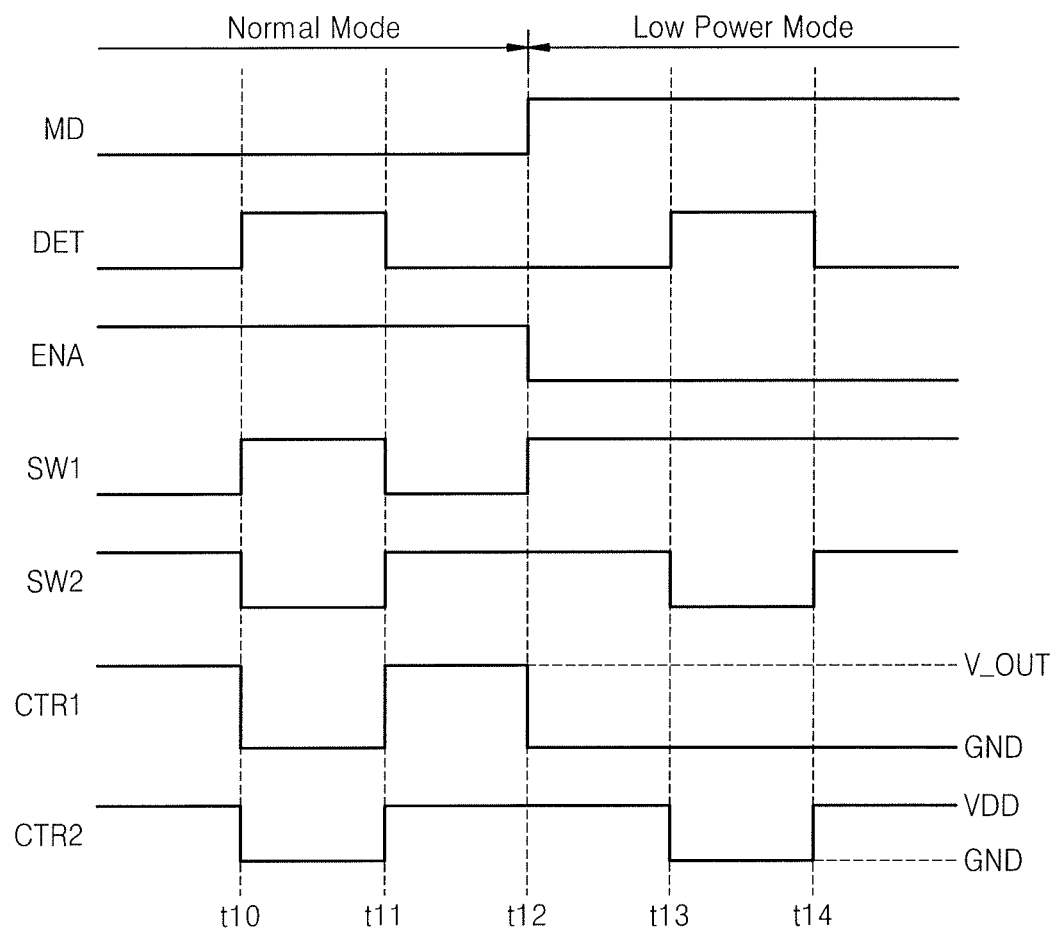

FIG. 10 is a block diagram of a USB device 900 according to an example embodiment. FIGS. 11A and 11B are diagrams of examples of an operation of the USB device 900 of FIG. 10, according to example embodiments. Specifically, FIG. 10 illustrates the USB device 900 including an OVP switch 910 including first and second OVP switches connected in parallel, and a switch controller 920 to control the OVP switch 910. FIGS. 11A and 11B illustrate signals of the USB device 900 of FIG. 10 with respect to time. In FIGS. 10, 11A, and 11B, it is assumed that the signals are active high signals. Although the OVP switch 910 including NFETs N91 and N92 as the first and second OVP switches is illustrated in FIGS. 10, 11A, and 11B, it will be understood that embodiments may be also applied to an OVP switch including PFETs as the first and second OVP switches. Hereinafter, the same descriptions as with reference to FIGS. 7A and 7B will not be repeated.

Referring to FIG. 10, the OVP switch 910 may include a first NFET N91 and a second NFET N92 connected in parallel, and that receive different signals, e.g., a first control signal CTR1 and a second control signal CTR2, respectively. The first NFET N91 may function as a first OVP switch that is turned on and off based on the first control signal CTR1, while the second NFET N92 may function as a second OVP switch that is turned on and off based on the second control signal CTR2.

The switch controller 920 may include a charge pump 921 and a control circuit 923. The control circuit 923 may include a control logic 923_1, a first switch 923_2, and a second switch 923_3. The control logic 923_1 may receive a detection signal DET and a mode signal MD, and generate a first switch signal SW1 and a second switch signal SW2 based on the detection signal DET and the mode signal MD. The first switch 923_2 may connect a gate of the first NFET N91 to a ground voltage or the charge pump 921 based on the first switch signal SW1. The second switch 923_3 may connect a gate of the second NFET N92 to a positive supply voltage VDD or the ground voltage based on the second switch signal SW2. States of the first switch 923_2 and the second switch 923_3 shown in FIG. 10 correspond to a deactivated first switch signal SW1 and a deactivated second switch signal SW2, i.e., a low-level first switch signal SW1 and a low-level second switch signal SW2, respectively.

Referring to FIG. 11A, in some embodiments, the switch controller 920 may turn off the second OVP switch (i.e., the second NFET N92) in a normal mode, and turn off the first OVP switch (i.e., the first NFET N91) in a low-power mode. Thus, an on-resistance Ron of the OVP switch 910 may be dependent on the first NFET N91 in the normal mode, and be dependent on the second NFET N92 in the low-power mode. Since the first NFET N91 may receive an output voltage V_OUT from the charge pump 921, when an overvoltage does not occur at the CC1 pin A5, the OVP switch 910 may have a first resistance R1 as the on-resistance Ron in the normal mode, and have a second resistance R2, which is higher than the first resistance R1, in the low-power mode.

As shown in FIG. 11A, the mode signal MD may have a low level in the normal mode until a time point t12 and a high level in the low-power mode from the time point t12. Alternatively, the mode signal MD may have a high level in the normal mode and a low level in the low-power mode.

Until a time point t10, an overvoltage may not be detected at the CC1 pin A5 and thus, the detection signal DET may be at a low level. The control logic 923_1 may generate a high-level enable signal ENA based on the low-level mode signal MD, so that the charge pump 921 may generate an output voltage V_OUT. Also, the control logic 923_1 may generate a low-level first switch signal SW1 and a low-level second switch signal SW2 based on the low-level detection signal DET. Thus, the first switch 923_2 and the second switch 923_3 are in states shown in FIG. 10, the output voltage V_OUT of the charge pump 921 may be provided as a first control signal CTR1 to the first NFET N91, and a ground voltage GND may be provided as a second control signal CTR2 to the second NFET N92. Thus, the first NFET N91 may be turned on, while the second NFET N92 may be turned off. Due to the output voltage V_OUT higher than a positive supply voltage VDD, the first NFET N91 may provide the first resistance R1 lower than the second resistance R2.

At the time point t10, an overvoltage may occur at the CC1 pin A5 and, thus, the detection signal DET may transition to a high level. In response to an activated detection signal DET, the control logic 923_1 may output an activated first switch signal SW1, so that the first control signal CTR1 may have a ground voltage GND due to the first switch 923_2. Thus, the first NFET N91 may be turned off, and the OVP switch 910 may be turned off.

At a time point t11, the overvoltage may be eliminated at the CC1 pin A5 and, thus, the detection signal DET may transition to a low level. In response to a deactivated detection signal DET, the control logic 923_1 may output a deactivated first switch signal SW1, so that the first control signal CTR1 may have an output voltage V_OUT. In some embodiments, as described above with reference to FIG. 7B, the control logic 923_1 may output a deactivated enable signal ENA unlike shown in FIG. 11A so that the charge pump 921 may be powered down from the time point t10 to the time point t11.

At a time point t12, the USB device 900 may be switched from the normal mode to the low-power mode and the mode signal MD may transition to a high level. In response to the high-level mode signal MD, the control logic 923_1 may output a deactivated enable signal ENA and, thus, the charge pump 921 may be powered down. Also, in response to the high-level mode signal MD, the control logic 923_1 may output an activated first switch signal SW1, so that the ground voltage GND may be provided as the first control signal CTR1 to the first NFET N91. In addition, in response to the high-level mode signal MD, the control logic 923_1 may output an activated second switch signal SW2, so that the positive supply voltage VDD may be provided as the second control signal CTR2 to the second NFET N92. As a result, the first NFET N91 may be turned off, and the second NFET N92 may be turned on. Thus, an on-resistance Ron of the OVP switch 910 may correspond to the second resistance R2 higher than the first resistance R1.

At a time point t13, an overvoltage may occur at the CC1 pin A5 and, thus, the detection signal DET may transition to a high level. In response to an activated detection signal DET, the control logic 923_1 may output a deactivated second switch signal SW2, so that the second control signal CTR2 may have a ground voltage GND due to the second switch 923_3. Thus, the second NFET N92 may be turned off, and the OVP switch 910 may be turned off.

At a time point t14, the overvoltage may be eliminated at the CC1 pin A5 and, thus, the detection signal DET may transition to a low level. In response to a deactivated detection signal DET, the control logic 923_1 may output an activated second switch signal SW2, so that the second control signal CTR2 may have a positive supply voltage VDD.

Referring to FIG. 11B, in some embodiments, the switch controller 920 may turn off the first NFET N91 in a low-power mode, and simultaneously turn on or off the first NFET N91 and the second NFET N92 in the normal mode. Thus, the on-resistance Ron of the OVP switch 910 may be dependent on the first NFET N91 and the second NFET N92, which are connected in parallel, in the normal mode, and dependent only on the second NFET N92 in the low-power mode. The first NFET N91 may receive an output voltage V_OUT from the charge pump 921. Since the first NFET N91 and the second NFET N92 are turned on together, when an overvoltage does not occur at the CC1 pin A5, the OVP switch 910 may have the first resistance R1 as the on-resistance Ron in the normal mode and the second resistance R2, higher than the first resistance R1, in the low-power mode.

As shown in FIG. 11B, until the time point t10, the control logic 923_1 may output an deactivated first switch signal SW1 and output an activated second switch signal SW2 in response to a deactivated detection signal DET. Thus, the first control signal CTR1 and the second control signal CTR2 may have an output voltage V_OUT and a positive supply voltage VDD, respectively, and both the first NFET N91 and the second NFET N92 may be turned on.

Figure 12:
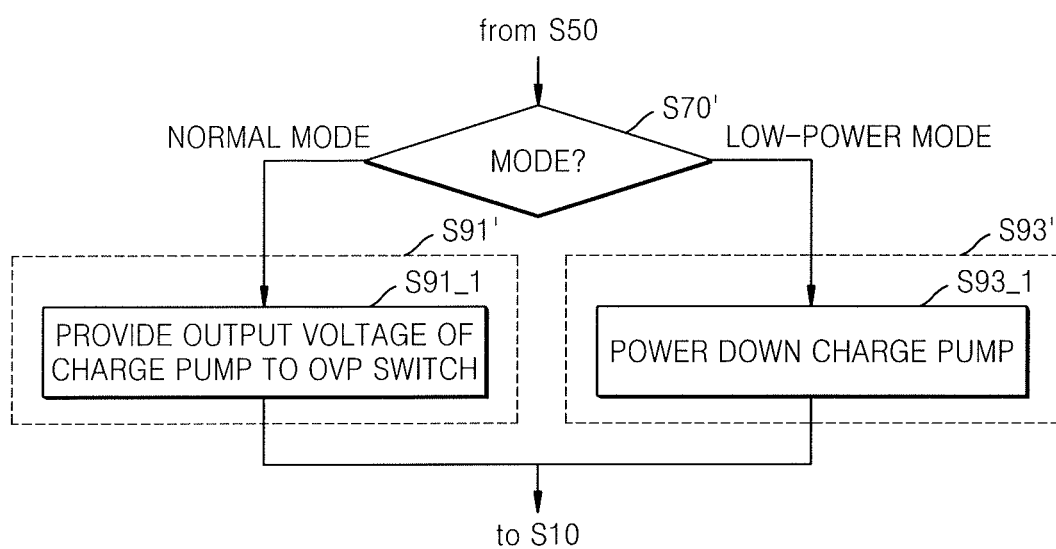
FIG. 12 illustrates a flowchart of a method of protecting an overvoltage in a USB interface according to an example embodiment.

FIG. 12 is a flowchart of a method of protecting an overvoltage in a USB interface according to an example embodiment. Specifically, FIG. 12 illustrates examples of operation S91 and operation S93 of FIG. 4. For example, the method of FIG. 12 may be performed by the switch controller 50 of FIG. 5. Hereinafter, the flowchart of FIG. 12 will be described with reference to FIGS. 4 and 5.

Subsequently to operation S50 of FIG. 4, in operation S70', the switch controller 50 may determine a mode of a USB device (e.g., 300 of FIG. 3) based on a mode signal MD. When the mode signal MD corresponds to a normal mode, operation S91' may be subsequently performed. When the mode signal MD corresponds to a low-power mode, operation S93' may be subsequently performed.

When the mode signal MD corresponds to the normal mode, in operation S91', an operation of setting an on-resistance Ron of an OVP switch (e.g., 351 of FIG. 3) as a first resistance R1 may be performed. As shown in FIG. 12, operation S91' may include operation S91_1. In operation S91_1, an operation of providing an output voltage V_OUT of the charge pump 51 to the OVP switch may be performed. The output voltage V_OUT may be a voltage boosted by the charge pump 51. Thus, the OVP switch may have a relatively low on-resistance Ron, i.e., the first resistance R1. Subsequently to operation S91', operation S10 of FIG. 4 may be performed.

When the mode signal MD corresponds to the low-power mode, in operation S93', an operation of setting the on-resistance Ron of the OVP switch (e.g., 351 of FIG. 3) as a second resistance R2 may be performed. As shown in FIG. 12, operation S93' may include operation S93_1. In operation S93_1, an operation of powering the charge pump 51 down may be performed. As a result, power consumption may be reduced and efficiency of the low-power mode may be improved. Subsequently to operation S93', operation S10 of FIG. 4 may be performed.

By way of summation and review, one or more embodiments may provide a circuit and method of protecting an overvoltage. One or more embodiments may provide a circuit and method of reducing power consumption. One or more embodiments may provide a circuit and method of providing different on-resistances in accordance with a mode and/or overcharge detection.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A circuit to protect against an overvoltage in a universal serial bus (USB) device that operates in a normal mode and a low-power mode, the circuit comprising:
   an overvoltage protection (OVP) switch connected to a pin of a USB receptacle; and
   a switch controller configured to detect an overvoltage of the pin and turn off the OVP switch in response to the overvoltage,
   wherein the switch controller is configured to provide a first voltage boosted from a second voltage to the OVP switch in the normal mode and to provide the second voltage to the OVP switch in the low-power mode, so that the OVP switch turns on, and
   wherein the switch controller is configured to provide a third voltage to the OVP switch in the normal mode and the low-power mode so that the OVP switch turns off,
   wherein the OVP switch comprises a first transistor and a second transistor connected in parallel to each other, and
   the switch controller is further configured
      to provide the first voltage to the first transistor in the normal mode so that the first transistor turns on, and
      to provide the third voltage to the first transistor in the low-power mode so that the first transistor turns off.

2. The circuit as claimed in claim 1, wherein:
   the OVP switch comprises an n-channel field-effect transistor (NFET),
   the first voltage is higher than the second voltage and the third voltage, and
   the second voltage is higher than the third voltage.

3. The circuit as claimed in claim 1, wherein:
   the OVP switch comprises a p-channel field-effect transistor (PFET),
   the first voltage is lower than the second voltage and the third voltage, and
   the second voltage is lower than the third voltage.

4. The circuit as claimed in claim 1, wherein
   the switch controller is further configured
      to provide the second voltage or the third voltage to the second transistor in the normal mode, and
      to provide the second voltage to the second transistor in the low-power mode so that the second transistor turns on.

5. The circuit as claimed in claim 1, wherein
   the pin is a channel configuration (CC) pin of the USB receptacle.

6. The circuit as claimed in claim 1, wherein
   the switch controller is further configured to determine that the overvoltage has occurred when a voltage of the pin deviates from a voltage range defined by a USB standard.

7. The circuit as claimed in claim 6, wherein
   the voltage range is between −0.25V and 1.8V.

8. The circuit as claimed in claim 1, wherein
   the switch controller is further configured to determine that the overvoltage has occurred when a voltage of the pin deviates from 0V and a positive voltage supplied to the switch controller.

9. The circuit as claimed in claim 1, wherein
   the switch controller
      comprises a charge pump configured to generate the first voltage from the second voltage, and
      is further configured to power down the charge pump in the low-power mode.

10. The circuit as claimed in claim 9, wherein
    the switch controller is further configured to power down the charge pump in response to the overvoltage.

11. A method for protecting against an overvoltage in a universal serial bus (USB) device, the method comprising:
    monitoring a voltage on a pin of a USB receptacle;
    turning off an overvoltage protection (OVP) switch having a first transistor and a second transistor connected in parallel to each other, the OVP switch connected to the pin of the USB receptacle when an overvoltage is detected, such that power between the pin and the USB device is interrupted;
    turning on the OVP switch when the overvoltage is eliminated; and
    determining whether the USB device is operating in a normal mode or a low-power mode, wherein:
    a first voltage difference between a control signal supplied to the OVP switch when the overvoltage is not detected and the control signal supplied to the OVP switch when the overvoltage is detected when operating in the normal mode is greater than a second voltage difference between the control signal supplied to the OVP switch when the overvoltage is not detected and the control signal supplied to the OVP switch when the overvoltage is detected when operating in the low-power mode,
    the voltage of the control signal is the same in the normal mode and the low-power mode when the overvoltage is detected, and
    providing, by a switch controller, a third voltage to the OVP switch in the normal mode and the low-power mode so that the OVP switch turns off,
    providing, by the switch controller, a first voltage to the first transistor in the normal mode so that the first transistor turns on, and providing, by the switch controller, the third voltage to the first transistor in the low-power mode so that the first transistor turns off.

12. The method as claimed in claim 11, wherein the USB device is a USB Type-C device.

13. The method as claimed in claim 11, further comprising:
   when the USB device is operating in the normal mode and the overvoltage is not detected, supplying an output voltage of a charge pump to the OVP switch, and
   when the USB device is operating in the low-power mode, powering down the charge pump.

14. The method as claimed in claim 13, further comprising:
   when the USB device is operating in the normal mode and the overvoltage is detected, powering down the charge pump.

15. The method as claimed in claim 11, wherein the monitoring the voltage on the pin comprises determining that the overvoltage has occurred when a voltage of the pin deviates from a voltage range defined by a USB standard or a positive supply voltage.

16. The method as claimed in claim 11, wherein the pin is a channel configuration (CC) pin of the USB receptacle.

17. A circuit to protect an overvoltage in a universal serial bus (USB) device, the circuit comprising:
   a first overprotection (OVP) switch and a second OVP switch connected in parallel; and
   a switch controller, the switch controller including:
      a first switch connected to the first OVP switch, and to be selectively connected to a ground voltage or a charge pump, the first switch to turn off the first OVP switch when an overvoltage is detected when the USB device is operating in a normal mode, such that power between a pin and the USB device is interrupted; and
      a second switch connected to the second OVP switch, and to be selectively connected to the ground voltage or a positive supply voltage, the second switch to turn off the second OVP switch when the overvoltage is detected and the USB device is operating in a low-power mode, such that power between the pin and the USB device is interrupted, wherein
   the first OVP switch has a first on-resistance and the second OVP switch has a second on-resistance, higher than the first on-resistance.

18. The circuit as claimed in claim 17, wherein the USB device is a USB Type-C device.

* * * * *